(12) United States Patent  
Ducate, Jr. et al.

(10) Patent No.: US 8,522,769 B2
(45) Date of Patent: Sep. 3, 2013

(54) FOLDING WORKTABLE FOR USE ON AN OUTDOOR GRILL

(75) Inventors: John Ducate, Jr., Columbia, SC (US); Sond-Kae (Robin) Ho, Taichung County (TW)

(73) Assignee: The Grill Company, LLC, Columbia, SC (US)

( * ) Notice: Subject to any disclaimer, the term of this patent is extended or adjusted under 35 U.S.C. 154(b) by 218 days.

(21) Appl. No.: 13/211,932

(22) Filed: Aug. 17, 2011

(65) Prior Publication Data
US 2012/0042866 A1   Feb. 23, 2012

Related U.S. Application Data

(60) Provisional application No. 61/374,684, filed on Aug. 18, 2010.

(51) Int. Cl.
*A47J 37/00* (2006.01)

(52) U.S. Cl.
USPC .......... 126/25 R; 108/48; 108/50.11; 108/59; 108/69; 108/77; 108/80; 108/81; 108/82; 108/99; 108/102; 108/115; 108/121; 108/123; 108/134; 108/152; 108/162; 108/166; 108/174; 108/176; 248/346.3; 403/72; 403/73; 403/83; 403/84; 403/91; 403/102; 403/321; 403/331

(58) Field of Classification Search
USPC ................. 126/25 R; 403/72, 73, 83, 84, 91, 403/102; 248/346.3; 108/48, 50.11, 65, 108/69, 77, 80, 81, 82, 99, 102, 115, 121, 108/123, 134, 152, 162, 166, 174, 176; 312/313, 314, 315, 316, 317.3
See application file for complete search history.

(56) References Cited

U.S. PATENT DOCUMENTS

| | | | |
|---|---|---|---|
| 1,369,577 A | 2/1921 | Miller | |
| 4,934,280 A | 6/1990 | Bae | |
| 5,069,142 A | 12/1991 | Matre | |
| D342,121 S | 12/1993 | Lim | |
| 5,771,815 A | 6/1998 | Leftwich | |
| 5,906,193 A | 5/1999 | Leach et al. | |
| 5,960,782 A | 10/1999 | Clements et al. | |
| 5,974,980 A | 11/1999 | Kent | |
| 6,575,155 B2 | 6/2003 | Brennan | |
| 7,284,393 B1 * | 10/2007 | Macmillan | 62/457.7 |
| 2003/0029436 A1 | 2/2003 | Carden et al. | |
| 2008/0245357 A1 * | 10/2008 | Meether et al. | 126/25 R |
| 2009/0114780 A1 | 5/2009 | Chen | |
| 2010/0154309 A1 * | 6/2010 | Shibata et al. | 49/338 |

* cited by examiner

*Primary Examiner* — Kenneth Rinehart
*Assistant Examiner* — Gajanan Prabhu
(74) *Attorney, Agent, or Firm* — McNair Law Firm, P.A.; Hunter Freeman

(57) ABSTRACT

The present invention relates to outdoor grill accessories, and more particularly, a foldable worktable attachment for an outdoor grill that includes a large table area that is interconnected to a lower shelf by two sets of foldable legs. When in an erect position, the table provides ample space for preparing foods and the like, but when in a collapsed position, the table lies flush against one of the sides of the grill housing, thus, enclosing the lower shelf and supporting legs that are folded and stored between the table and a recessed area included in the grill housing.

20 Claims, 6 Drawing Sheets

FOLDING WORKTABLE FOR USE ON AN OUTDOOR GRILL

This application claims the benefit of priority from Application No. 61/374,684, which was filed on Aug. 18, 2010.

BACKGROUND OF THE INVENTION

1) Field of the Invention

The present invention relates to outdoor grill accessories, and more particularly, a foldable worktable attachment for an outdoor grill that provides a large work space for preparing foods and the like when in an erect position, but that may also be collapsed into a very compact position so that it lies flush against one of the sides of the grill housing.

2) Description of Related Art

One of the major limitations of an outdoor grill is the lack of work surface that is provided on the grill for purposes of preparing or simply storing foods that are to be, or have already been, cooked on the grill. Conventional grills typically provide two small shelves, one located on each side of the cooking surface of the grill. In some instances, one of the shelves is actually a side burner that can only be used as shelf space when not in use. When the side burner is in use, however, the grill only provides one shelf.

As anyone who has used an outdoor grill knows, it is advantageous to be able to store foods that are waiting to be grilled or that have been grilled on an easily reached shelf space. It would further be advantageous to have sufficient work space to be able to prepare the food that is to be cooked on the grill, thus minimizing the number of trips between the kitchen and the outdoor grill. However, grill manufacturers know that the size of the grill is of concern to consumers in that consumers have space limitations and cannot always accommodate a grill that is more than about 4-6 feet long. Accordingly, most outdoor grills utilize one or more small shelves. There has been a long felt need for a grill having an ample grilling surface as well as an ample work space for food preparation while keeping the grill within an acceptable and custom length for ordinary outdoor grills.

Accordingly, it is an object of the present invention to provide a grill having a worktable that provides an ample surface on which to store or prepare foods to be grilled, while keeping the dimensions of the grill within consumers' expectations and preferences.

Accordingly, it is another object of the present invention to provide a grill having a worktable that may be folded into a compact position along the side of the grill when the table is not in use so as to minimize the size of the grill when not in use.

Accordingly, it is another object of the present invention to provide an aftermarket accessory that may be attached to an outdoor grill to provide a foldable worktable with sufficient room to prepare and store foods to be grilled.

SUMMARY OF THE INVENTION

The above objectives are accomplished according to the present invention by providing a grill having a grill frame that defines a side of the grill; a worktable having a proximal end and a distal end, wherein the proximal end is pivotally carried by the side of the grill frame; a lower shelf disposed below the worktable and having a proximal end and a distal end, wherein the proximal end is pivotally carried by the side of the grill frame; an upper support leg having an upper end and a lower end, wherein the upper end is pivotally connected to the worktable; a lower support leg having an upper end that is pivotally connected to the lower end of the upper support leg and a lower end of the lower support leg being pivotally connected to the lower shelf; and, whereby the worktable attachment has an erect position wherein the upper support leg and the lower support leg are placed into a generally perpendicular position with respect to the worktable and the lower shelf and a collapsed position wherein the worktable lies generally flush against the grill frame and the upper support leg and the lower support leg are placed into a generally parallel position with respect to the worktable and the lower shelf.

In a further embodiment, the outdoor grill further comprises a safety clip disposed generally at the upper end of the lower support leg, wherein the safety clip is biased and adapted to engage a flange disposed generally at the lower end of the upper support leg when the worktable attachment is in the erect position so that the safety clip must disengage the flange prior to placing the worktable attachment in the collapsed position.

In yet a further embodiment, the outdoor grill further comprises a support bar having a first member attached to an upper surface of the lower shelf at a point generally proximate to the proximal end of the lower shelf, a second member pivotally connected to the grill frame and generally opposing the first member and a third member interconnecting the first member and the second member.

In a further embodiment, the grill frame defines a recess in the side of the grill that is adapted to receive the lower shelf so that at least a portion of the lower shelf is contained within the recess when the worktable attachment is in the collapsed position.

In a further embodiment, the upper end of the upper support leg is pivotally connected to a lower surface of the worktable at a point that is spaced from the distal end of the worktable by a distance that is at least as long as the length of the upper support leg so that when the worktable attachment is placed in the collapsed position, the upper support leg lies generally flush against the lower surface of the worktable with the lower end of the upper support leg being generally adjacent to the distal end of the worktable.

In a further embodiment, the lower end of the lower support leg is pivotally connected to the lower shelf at a point that is generally adjacent to the distal end of the lower shelf.

In a further embodiment, the outdoor grill further comprises an actuator having an upper end that is pivotally connected to a lower surface of the worktable and a lower end that is carried by the side of the grill.

The above objectives are also achieved by providing a worktable having an upper surface, a lower surface, a proximal end and a distal end; a first connection member carried generally at the proximal end of the worktable for pivotally connecting the worktable to a grill frame; a lower shelf disposed beneath the work table and having an upper surface, a lower surface, a proximal end and a distal end; a second connection member carried generally at the proximal end of the lower shelf for pivotally connecting the lower shelf to the grill frame; a support leg interconnecting the worktable and the lower shelf, wherein the support leg is defined by an upper support leg and a lower support leg and wherein the upper support leg is pivotally carried by the lower surface of the worktable and is hingedly connected to the lower support leg and the lower portion is pivotally carried by the lower shelf; whereby the worktable has an erect position wherein the support leg is in a generally perpendicular position with respect to the worktable and the lower shelf and the worktable has a collapsed position wherein the lower surface of the worktable is placed generally adjacent and parallel to the lower surface of the lower shelf and wherein the upper support leg and the lower support leg are placed into a generally parallel position with respect to the worktable and the lower shelf.

In a further embodiment, the worktable further comprises a safety clip disposed generally at an upper end of the lower support leg, wherein the safety clip is biased and adapted to engage a flange disposed generally at a lower end of the upper support leg when the worktable is in the erect position so that the safety clip must disengage the flange prior to placing the worktable in the collapsed position.

In a further embodiment, an upper end of the upper support leg is pivotally connected to the lower surface of the worktable at a point that is spaced from the distal end of the worktable by a distance that is at least as long as the length of the upper support leg so that when the worktable is placed in the collapsed position, the upper support leg lies generally flush against the lower surface of the worktable with a lower end of the upper support leg being generally adjacent to the distal end of the worktable.

In a further embodiment, the lower support leg is pivotally carried by an outer side of the lower shelf at a point that is generally adjacent to the distal end of the lower shelf so that when the worktable is placed in the collapsed position, the lower support leg is placed generally adjacent to, and in a generally parallel position with respect to the outer side of the lower shelf.

In a further embodiment, the worktable further comprises an actuator having a upper end that is pivotally connected to the lower surface of the worktable and a lower end that is adapted to be carried by the grill.

In a further embodiment, the lower shelf has a length that is shorter than the length of the worktable.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail.

Figure 1:
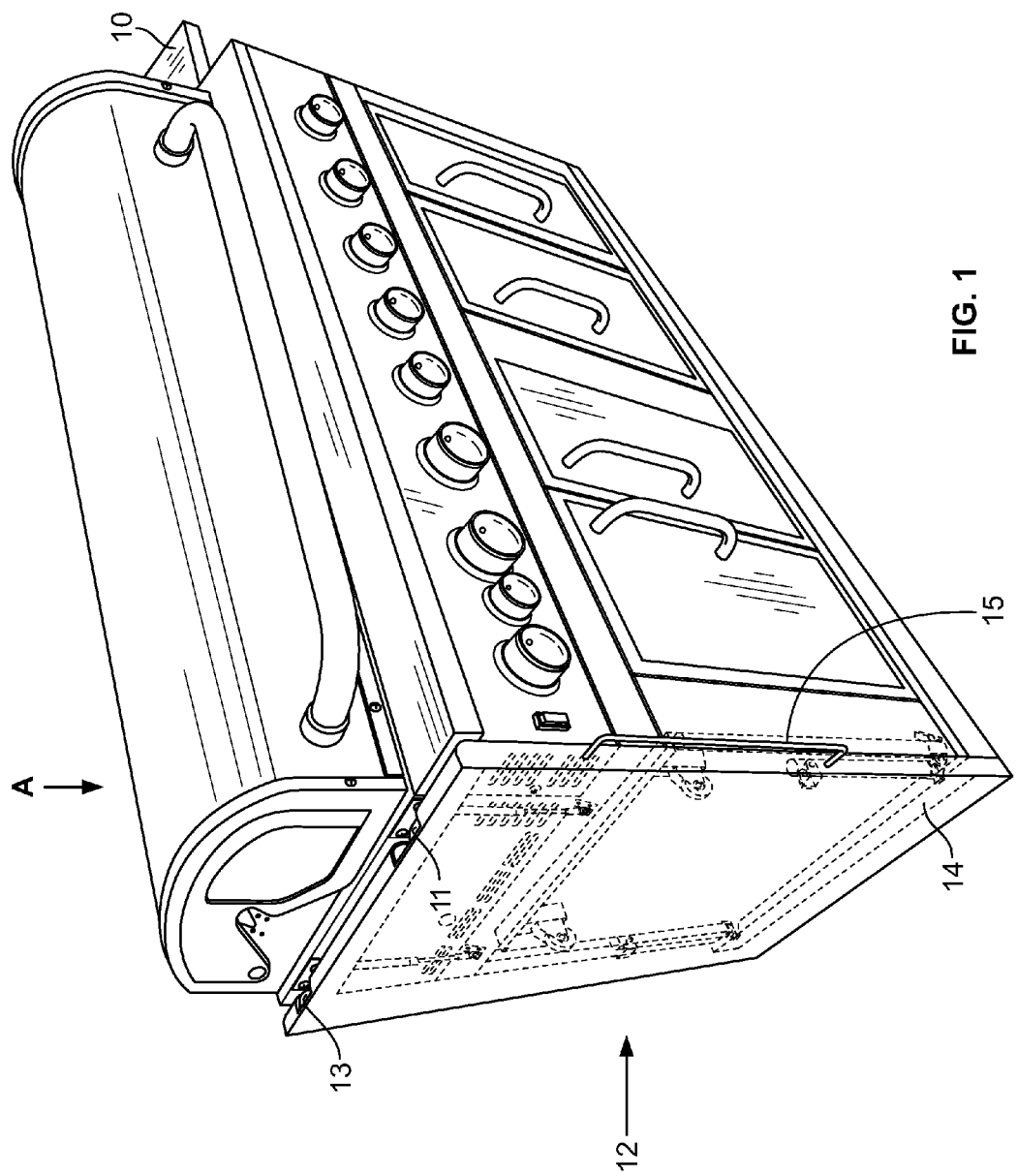
FIG. 1 shows a perspective view of the present invention where the foldable worktable is in a collapsed position.

Referring now to FIG. 1, an outdoor grill is generally shown as A. As can be seen, the grill includes a side burner 10 that may serve as a small shelf when not in use. On the opposite side, the grill includes a foldable worktable attachment generally shown as 12 that is hingedly connected to the grill housing by hinges 11 and 13. As can be seen, when in a collapsed position, the attachment folds up compactly against the side of the grill such that the upper surface of the table 14 acts as the side of the grill housing. The side of the table 14 is provided with a handle 15 to assist with placing the table attachment 12 in an erect or collapsed position. While the shown embodiment includes hinges as a connection member for pivotally connecting the worktable attachment to the grill, any connection member that provides a pivotal connection that is generally known in the art could be used.

Figure 2:
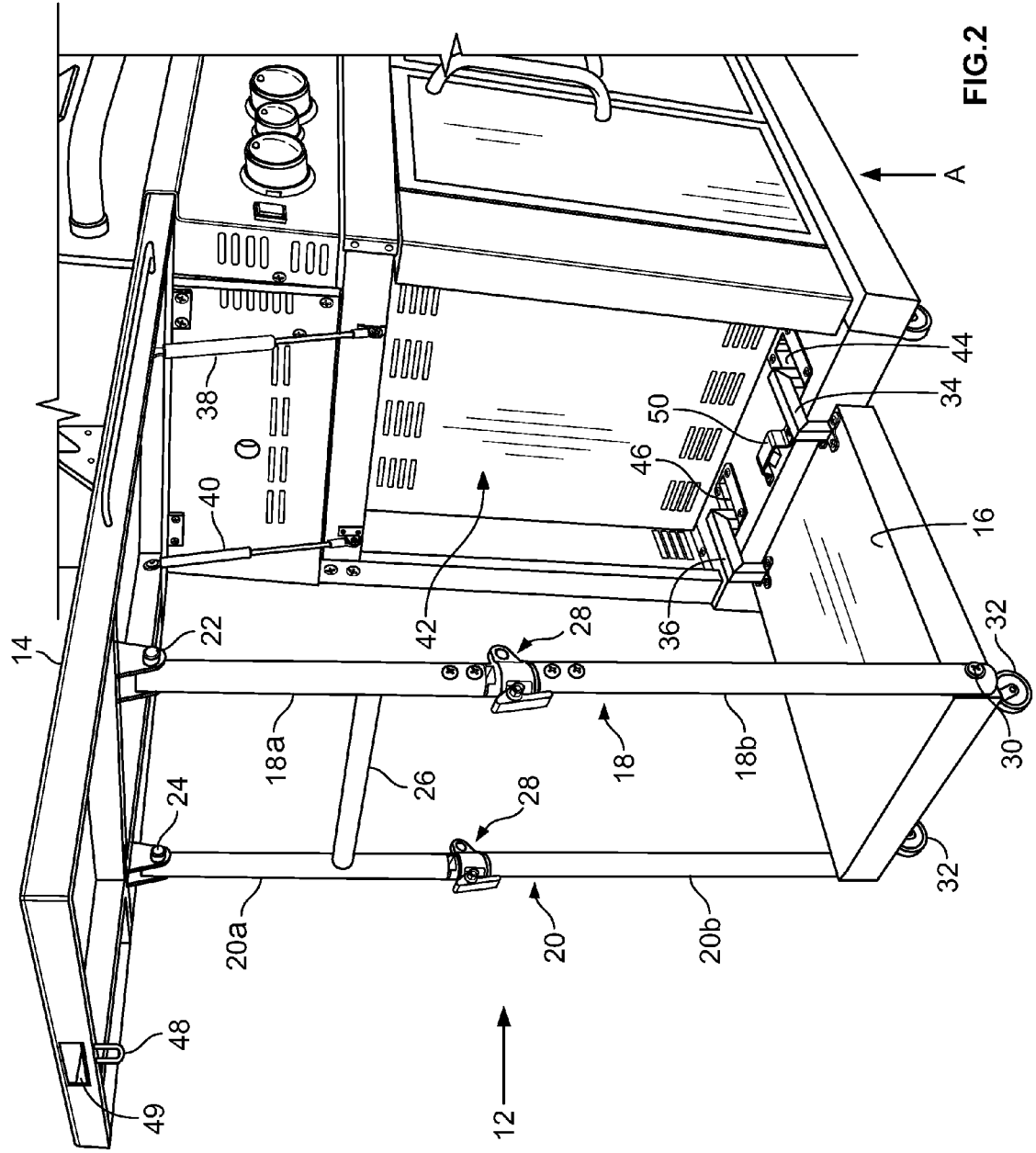
FIG. 2 shows a perspective view of the invention in an erect position.

Referring now to FIG. 2, the worktable attachment 12 can be seen in an erect position. The attachment includes a table 14 and a lower shelf 16. The table 14 is hingedly interconnected to the lower shelf by two sets of hinged legs shown generally as 18 and 20. Each set of legs has an upper leg portion 18a and 20a, respectively, that are hingedly connected to a lower leg portion 18b and 20b, respectively. The upper leg portions 18a and 20a are pivotally connected to the table 14 at the hinge points 22 and 24, respectively. A cross bar 26 interconnects the upper leg portions 18a and 20a to ensure that the upper leg portions maintain the same angular relation to the table at all times.

The lower leg portions 18b and 20b, respectively, are hingedly connected to upper leg portions 18a and 20a, respectively, by hinged safety clips 28. As discussed more fully below, hinged safety clips 28 allow the upper and lower leg portions to be aligned in a fully erect position where said upper and lower leg portions form a single leg that is perpendicularly arranged with respect to the table 14 and the bottom shelf 16. Lower leg portions are also hingedly connected to bottom shelf 16 at hinge points 30 (other hinge point not shown).

Lower shelf 16 is supported by two caster wheels 32 and is hingedly connected to the grill by the support bars 34 and 36. In one embodiment support bars 34 and 36 are removably connected to lower shelf 16. In other embodiments, support bars 34 and 36 are integral with lower shelf 16. Table 14 is supported by the legs 18 and 20 and in the shown embodiment, table is also supported by two actuators 38 and 40, which are hingedly connected to the grill and the underside of the table 14. In alternate embodiments, the table 14 could be supported by a single actuator or simply by the hinged connection points (shown in FIGS. 1 as 11 and 13). However, the actuators provide additional resistance which assists in the lifting of the table 14 when it is being placed in an erect position as well as decelerating the table when it is being placed in a collapsed position.

To allow the table attachment 12 to be folded in a compact manner so that it lies generally flush to the side of the grill, the grill housing is provided with a recessed compartment 42 that is adapted to receive lower shelf 14 as well as lower leg portions 18b and 20b when the table attachment 12 is placed in a fully collapsed position. In alternate embodiments that do not include a lower shelf 16, however, recessed compartment 42 would not be needed for the table attachment 12 to lie generally flush against the side of the grill housing. Grill housing also includes two openings 44 and 46 adapted to receive support bars 34 and 36 as the lower shelf 16 is rotated upwardly and into the recess 42. To keep the attachment secured in the collapsed position, table 14 includes a loop 48 that is designed to be received and secured by a latch 50. Table 14 is also provided with an opening 49 disposed at the distal end of the table that provides a hand-hold for assisting with the erection or collapse of the table attachment.

Figure 3:
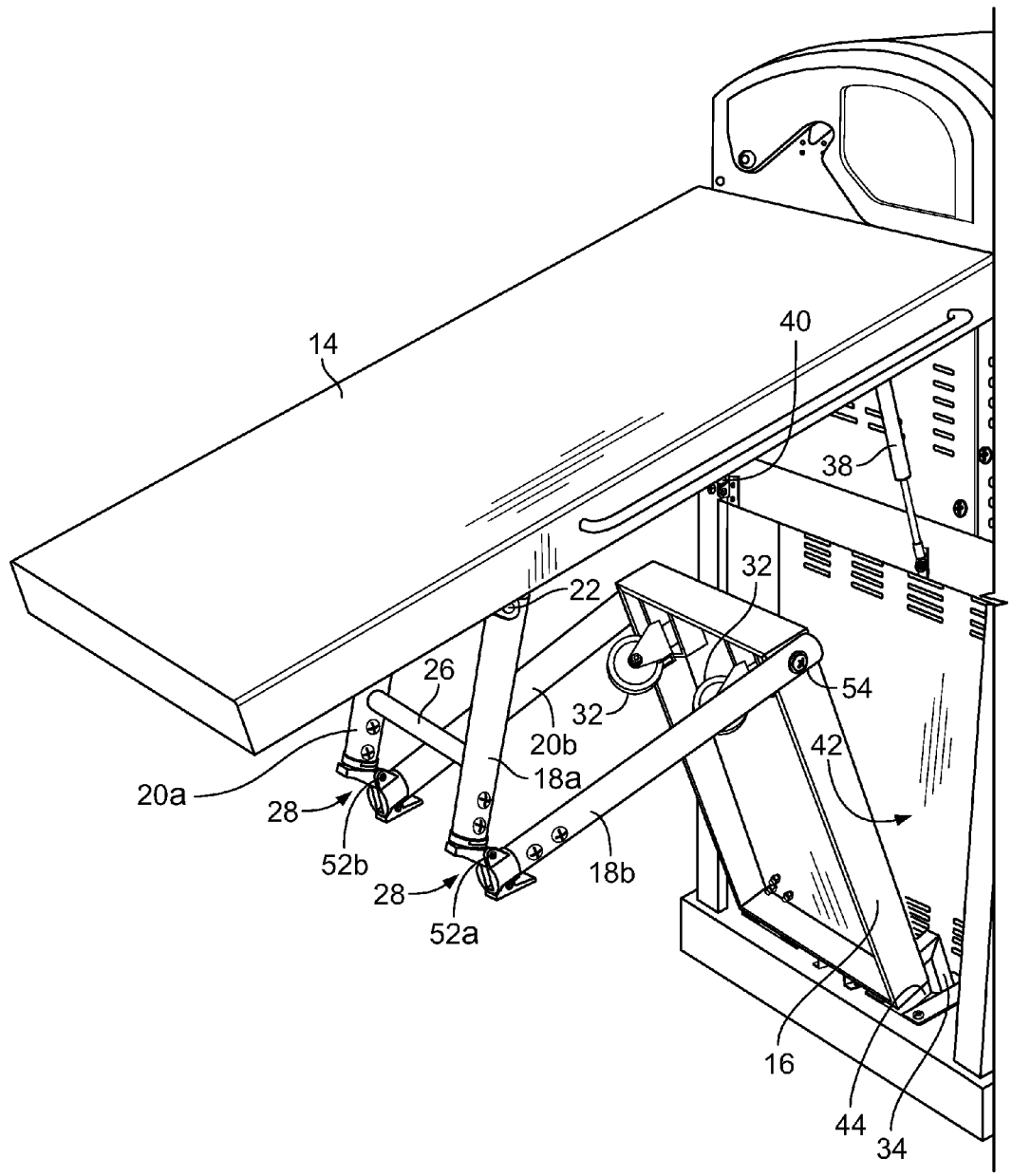
FIG. 3 shows a perspective view of the invention where the foldable worktable is being placed in an erect position.
Figure 4:
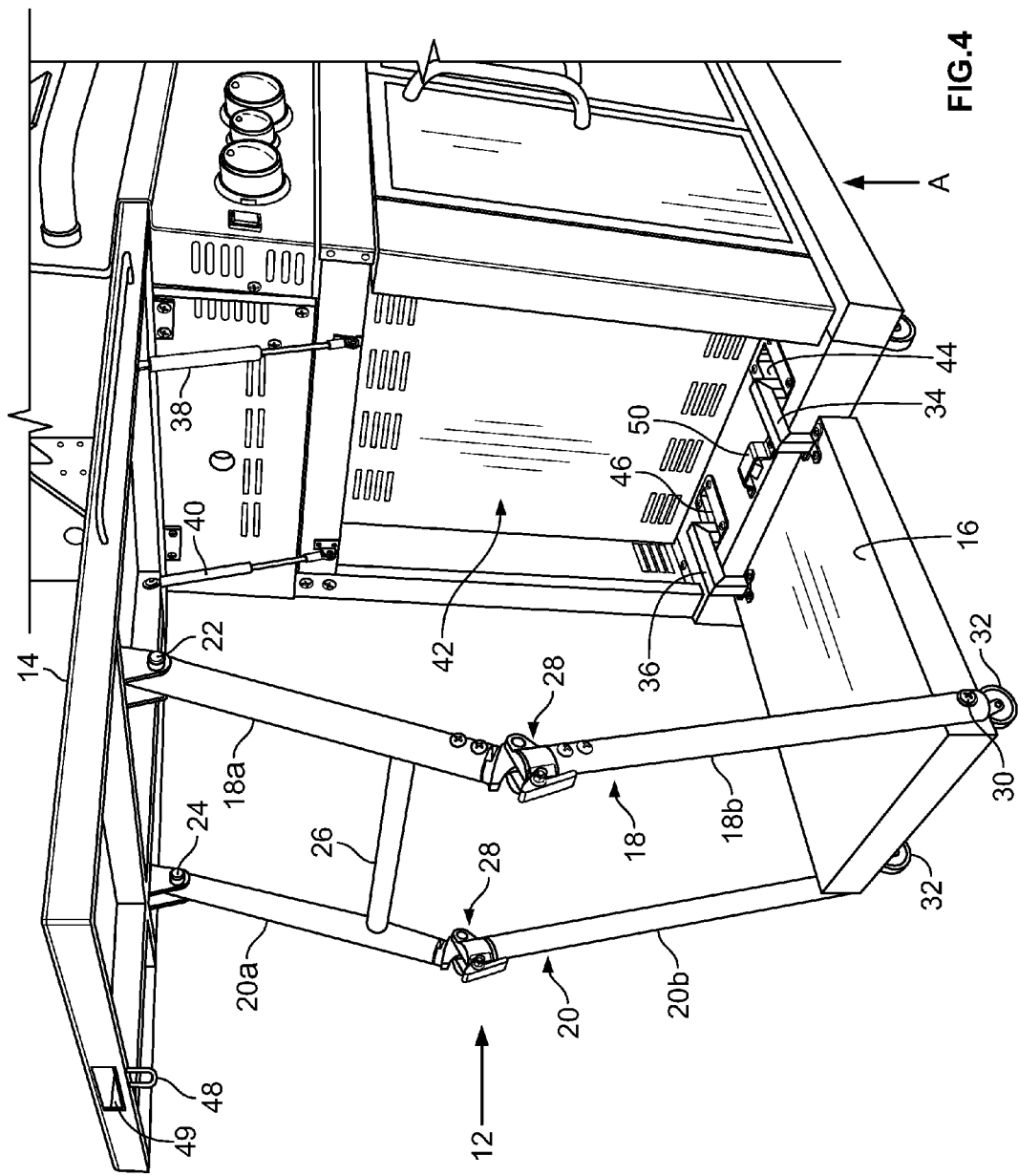
FIG. 4 shows a perspective view of the invention where the foldable worktable is in a nearly erect position.

Referring now to FIGS. 3 and 4, the manner in which the worktable attachment 12 is collapsed and erected can be more fully seen. For purposes of consistency, reference to these Figures will be made with regard to the manner in which the attachment is erected. However, one skilled in the art would understand that the attachment may be collapsed in the exact opposite manner in which it is erected. As the table 14 is rotated in a clockwise direction away from the side of the grill, the upper leg portions 18a and 20a are caused to rotate in a counterclockwise direction around the hinge point 22 connecting upper leg portions to the table 14 (hinge point for upper leg portion 20a not shown). In the shown embodiment, the hydraulic actuators 38 and 40 assist with the rotation of the worktable 14. The rotation of the upper leg portions causes the lower leg portions 18b and 20b to simultaneously rotate in a clockwise direction at both the leg hinge points 52a and 52b as well as the lower shelf hinge points 54 connecting the lower leg portions to the lower shelf 16. The rotation of the lower leg portions 18b and 20b causes the lower shelf 16 to rotate in a counterclockwise direction. As discussed more fully with respect to FIG. 6, the generally "n" shape of the support bars 34 (support bar 36 not shown) allow the lower shelf to rotate out of the recessed area 42 until the caster wheels contact the ground. As the lower shelf 16 is rotated, the support bars 34 which are hingedly connected to the grill housing, are raised out of the openings 44 which house the support bars when the attachment is in a collapsed position.

Figure 5:
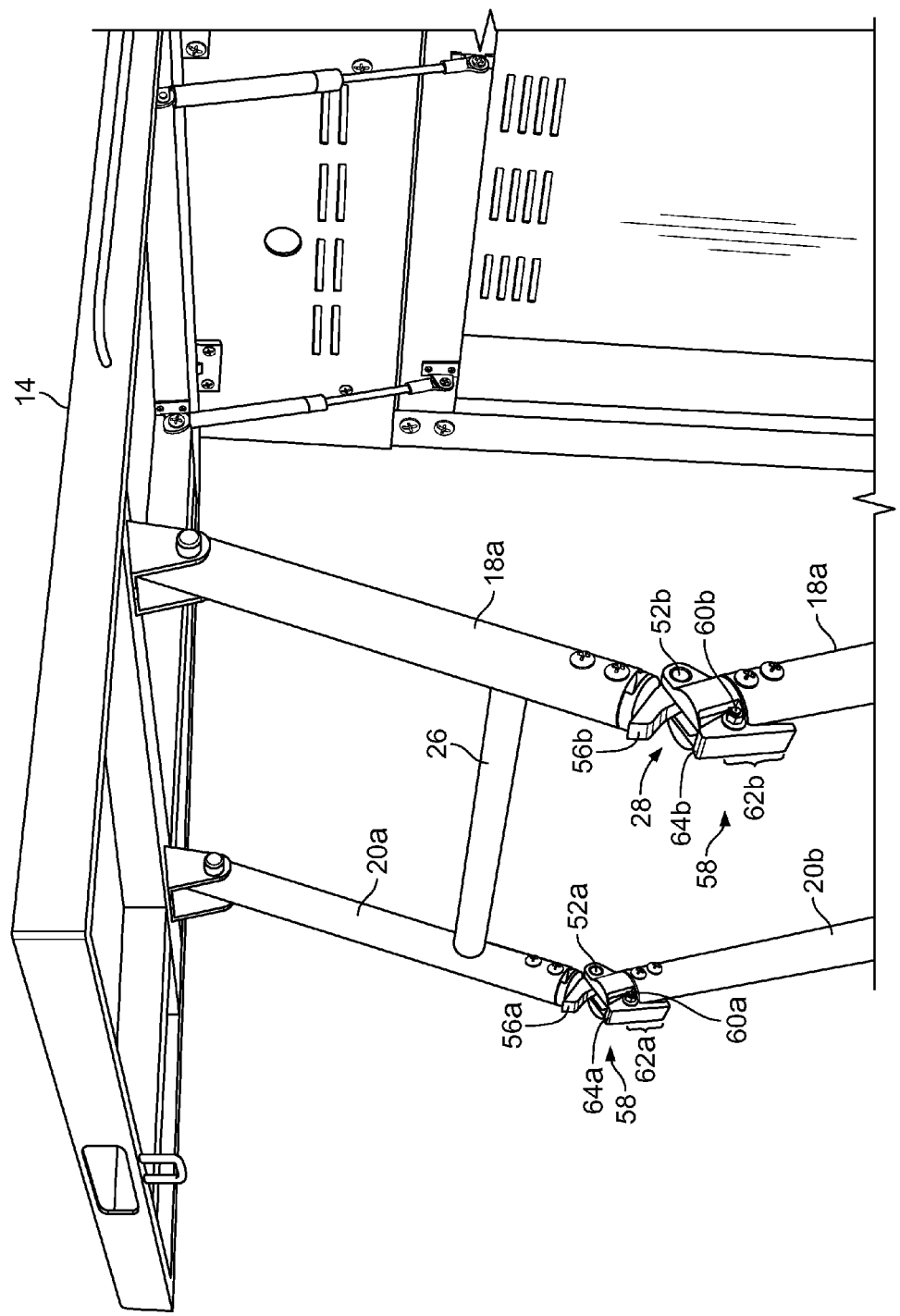
FIG. 5 shows a close-up perspective view of the hinges included on the legs of the foldable worktable.

Once the wheels 32 contact the ground, the worktable attachment will be placed in the position shown in FIG. 4. The only step necessary to place the table attachment shown in FIG. 4 in the fully erect position shown in FIG. 2 is to lock the upper leg portions and the lower leg portions in a aligned position via safety clip 28, at which point the legs can be locked in an upright position via the safety clip 28. As can be seen in FIG. 5, each of the upper leg portions includes a catch 56a and 56b that provides a ledge and/or flange protruding from the upper leg portions 18a and 20a. The lower leg portions 18b and 20b include a latch 58a and 58b that is hingedly connected to lower leg portions by a biased hinge point 60a and 60b. The latch is designed so that the bottom portion of the latch, generally shown as 62a and 62b, may be depressed towards the lower leg portions 18b and 20b, thus causing the upper portion of the latch 64a and 64b to rotate away from the leg portions so that the upper and lower leg portions may be placed in an erect position. Once the upper and lower leg portions are aligned in the erect position, the lower portion of the latch 62a and 62b can be released so that the upper portion of the latch receives and secures the catch 56a and 56b. This locked position ensures that the legs stay in an erect position to support the worktable.

Figure 6:
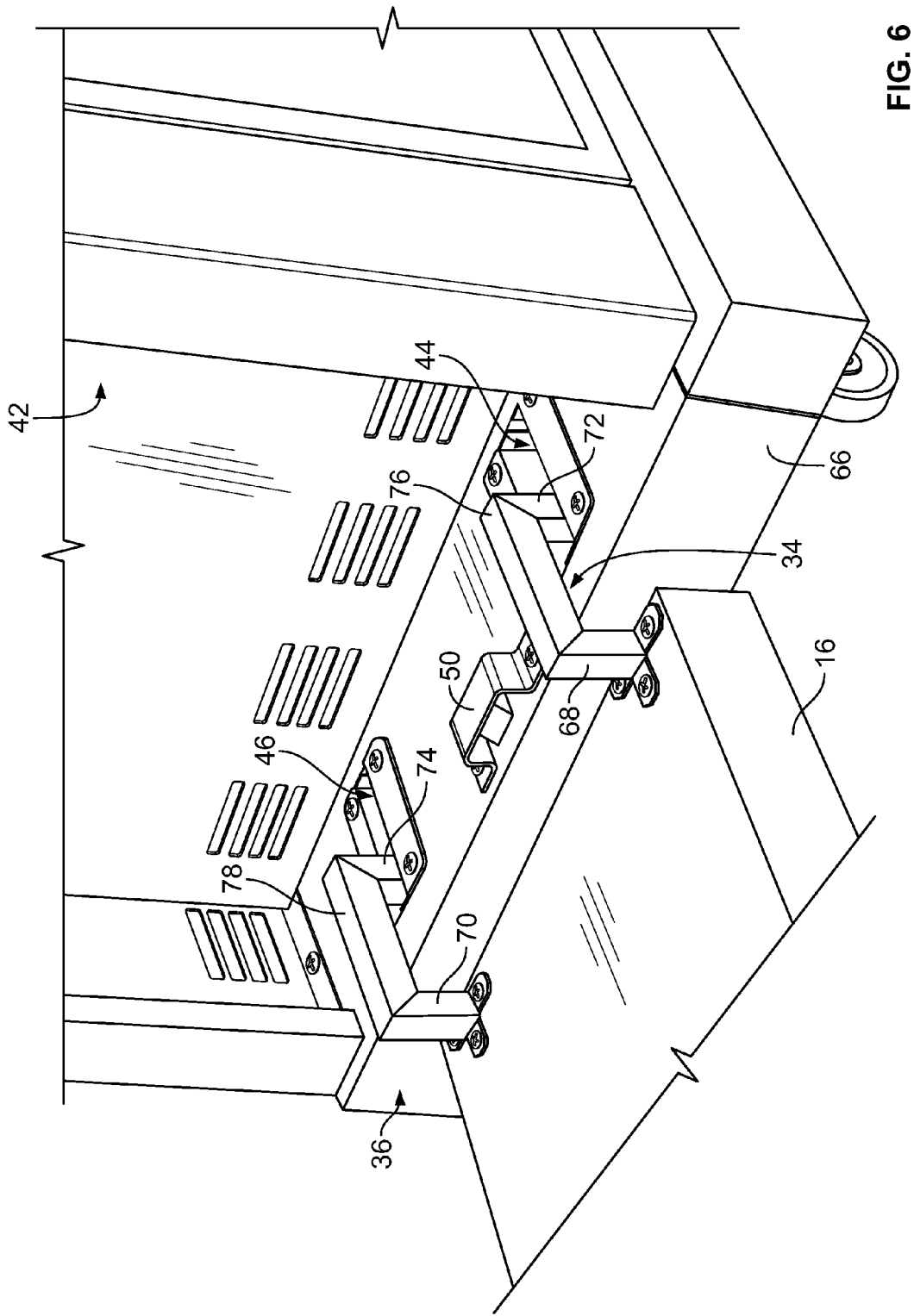
FIG. 6 shows a close-up perspective view of the hinges connecting the bottom shelf of the foldable worktable to the grill.

Referring now to FIG. 6, the manner by which the lower shelf 16 is hingedly connected to the grill can be more clearly seen. As shown in FIGS. 1 and 3, when in a collapsed position, the lower shelf 16 is adapted to fit into the recessed space 42 of the grill housing so that the attachment can collapse into a compact position that acts as one of the sides for the grill housing. In order for lower shelf 16 to be able to rotate up and over grill housing base 66, support bars 34 and 36 are provided that have a generally "n" shape. A first vertical portion 68 and 70 of the support bars are attached to lower shelf 16. A second vertical portion 72 and 74 of the support bars are hingedly attached to the grill housing base 66. The two vertical portions are interconnected by a horizontal portion 76 and 78. When rotated in a clockwise direction, the support bars 34 and 36 cause the lower shelf 16 to vertically raise over the grill housing base 66 so that the shelf may fit into the recessed portion 42 of the grill housing. Because the support bars 34 and 36 have a generally "n" shape, the grill housing base 66 is provided with two openings 44 and 46 designed to receive the support bars as they rotate in a clockwise direction.

While a preferred embodiment of the invention has been described using specific terms, such description is for illustrative purposes only, and it is to be understood that changes and variations may be made without departing from the spirit or scope of the following claims.

What is claimed is:

1. An outdoor grill comprising:
   a grill having a grill frame that defines a side of said grill;
   a worktable having a proximal end and a distal end, wherein said proximal end is pivotally carried by said side of said grill frame;
   a lower shelf disposed below said worktable and having a proximal end and a distal end, wherein said proximal end is pivotally carried by said side of said grill frame;
   an upper support leg having an upper end and a lower end, wherein said upper end is pivotally connected to said worktable;
   a lower support leg having an upper end that is pivotally connected said lower end of said upper support leg and a lower end of said lower support leg being pivotally connected to said lower shelf; and,
   whereby said worktable attachment has an erect position wherein said upper support leg and said lower support leg are placed into a generally perpendicular position with respect to said worktable and said lower shelf and a collapsed position wherein said worktable lies generally flush against said grill frame and said upper support leg and said lower support leg are placed into a generally parallel position with respect to said worktable and said lower shelf.

2. The outdoor grill of claim 1 further comprising a safety clip disposed generally at said upper end of said lower support leg, wherein said safety clip is biased and adapted to engage a flange disposed generally at said lower end of said upper support leg when said worktable attachment is in said erect position so that said safety clip must disengage said flange prior to placing said worktable attachment in said collapsed position.

3. The outdoor grill of claim 1 further comprising a support bar having a first member attached to an upper surface of said lower shelf at a point generally proximate to said proximal end of said lower shelf, a second member pivotally connected to said grill frame and generally opposing said first member and a third member interconnecting said first member and said second member.

4. The outdoor grill of claim 1 wherein said grill frame defines a recess in said side of said grill that is adapted to receive said lower shelf so that at least a portion of said lower shelf is contained within said recess when said worktable attachment is in said collapsed position.

5. The outdoor grill of claim 1 wherein said upper end of said upper support leg is pivotally connected to a lower surface of said worktable at a point that is spaced from said distal end of said worktable by a distance that is at least as long as the length of said upper support leg so that when said worktable attachment is placed in said collapsed position, said upper support leg lies generally flush against said lower surface of said worktable with said lower end of said upper support leg being generally adjacent to said distal end of said worktable.

6. The outdoor grill of claim 1 wherein said lower end of said lower support leg is pivotally connected to said lower shelf at a point that is generally adjacent to said distal end of said lower shelf.

7. The outdoor grill of claim 1 further comprising an actuator having an upper end that is pivotally connected to a lower surface of said worktable and a lower end that is carried by said side of said grill.

8. An outdoor grill comprising:
a grill frame that defines a side of said grill;
a worktable having an upper surface, a lower surface, a proximal end and a distal end, wherein said proximal end is pivotally carried by said side of said grill;
a lower shelf that is disposed below said worktable and having a length that is shorter than the length of said worktable, wherein said lower shelf has a proximal end and a distal end and said proximal end is pivotally carried by said side of said grill frame;
a support leg interconnecting said worktable and said lower shelf, wherein said support leg is defined by an upper support leg and a lower support leg and wherein said upper support leg is pivotally carried by said lower surface of said worktable and is hingedly connected to said lower support leg and said lower support leg is pivotally carried by said lower shelf;
whereby said worktable has an erect position wherein said support leg is in a generally perpendicular position with respect to said worktable and said lower shelf, and said worktable has a collapsed position wherein said worktable lies generally flush against said grill frame and said upper support leg and said lower support leg are placed into a generally parallel position adjacent to said worktable and said lower shelf.

9. The outdoor grill of claim 8 further including a safety clip disposed generally at an upper end of said lower support leg, wherein said safety clip is biased and adapted to engage a flange disposed generally at a lower end of said upper support leg when said worktable is in said erect position so that said safety clip must disengage said flange prior to placing said worktable in said collapsed position.

10. The outdoor grill of claim 8 further including:
a recess defined in said side of said grill by said grill frame, said recess being adapted to receive said lower shelf so that at least a portion of said lower shelf is contained within said recess when said worktable is in said collapsed position; and
a support bar opening defined in the bottom of said recess adapted to house a support bar that pivotally connects said lower shelf to said grill frame when said worktable is in said closed position.

11. The outdoor grill of claim 10 wherein said support bar comprises a first member attached to an upper surface of said lower shelf at a point generally adjacent to said proximal end of said lower shelf, a second member generally opposing said first member that is pivotally carried by said grill frame at a point generally adjacent to said support bar opening and a third member interconnecting said first member and said second member.

12. The outdoor grill of claim 8 wherein an upper end of said upper support leg is pivotally connected to said lower surface of said worktable at a point that is spaced from said distal end of said worktable by a distance that is at least as long as the length of said upper support leg so that when said worktable is placed in said collapsed position, said upper support leg lies generally flush against said lower surface of said worktable with a lower end of said upper support leg being generally adjacent to said distal end of said worktable.

13. The outdoor grill of claim 8 further comprising an actuator having an upper end that is pivotally connected to said lower surface of said worktable and a lower end that is carried by said side of said grill.

14. The outdoor grill of claim 8 wherein said lower support leg is pivotally carried by an outer side of said lower shelf at a point that is generally adjacent to said distal end of said lower shelf so that when said worktable is placed in said collapsed position, said lower support leg is placed generally adjacent to, and in a generally parallel position with respect to said outer side of said lower shelf.

15. A collapsible worktable for use on an outdoor grill comprising:
a worktable having an upper surface, a lower surface, a proximal end and a distal end;
a first connection member carried generally at said proximal end of said worktable for pivotally connecting said worktable to a grill frame;
a lower shelf disposed beneath said work table and having an upper surface, a lower surface, a proximal end, and a distal end;
a second connection member carried generally at said proximal end of said lower shelf for pivotally connecting said lower shelf to the grill frame;
a support leg interconnecting said worktable and said lower shelf, wherein said support leg is defined by an upper support leg and a lower support leg and wherein said upper support leg is pivotally carried by said lower surface of said worktable and is hingedly connected to said lower support leg and said lower portion is pivotally carried by said lower shelf;
whereby said worktable has an erect position wherein said support leg is in a generally perpendicular position with respect to said worktable and said lower shelf and said worktable has a collapsed position wherein said lower surface of said worktable is placed generally adjacent and parallel to said lower surface of said lower shelf and wherein said upper support leg and said lower support leg are placed into a generally parallel position with respect to said worktable and said lower shelf.

16. The worktable of claim 15 further comprising a safety clip disposed generally at an upper end of said lower support leg, wherein said safety clip is biased and adapted to engage a flange disposed generally at a lower end of said upper support leg when said worktable is in said erect position so that said safety clip must disengage said flange prior to placing said worktable in said collapsed position.

17. The worktable of claim 15 wherein an upper end of said upper support leg is pivotally connected to said lower surface of said worktable at a point that is spaced from said distal end of said worktable by a distance that is at least as long as the length of said upper support leg so that when said worktable is placed in said collapsed position, said upper support leg lies generally flush against said lower surface of said worktable with a lower end of said upper support leg being generally adjacent to said distal end of said worktable.

18. The worktable of claim 15 wherein said lower support leg is pivotally carried by a outer side of said lower shelf at a point that is generally adjacent to said distal end of said lower shelf so that when said worktable is placed in said collapsed position, said lower support leg is placed generally adjacent to and in a generally parallel position with respect to said outer side of said lower shelf.

19. The worktable of claim 15 further comprising an actuator having an upper end that is pivotally connected to said lower surface of said worktable and a lower end that is adapted to be carried by the grill.

20. The worktable of claim 15, wherein said lower shelf has a length that is shorter than the length of said worktable.

\* \* \* \* \*